T. J. WILLIAMS.
HOSE CLAMP.
APPLICATION FILED FEB. 14, 1916.
1,259,329.
Patented Mar. 12, 1918.
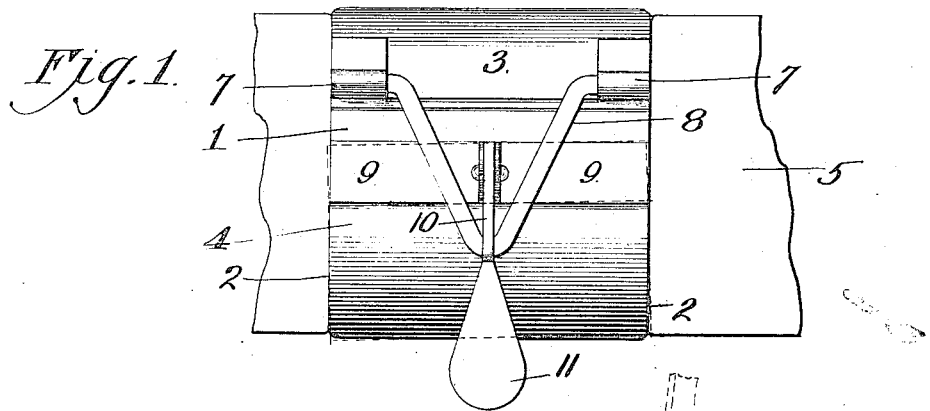
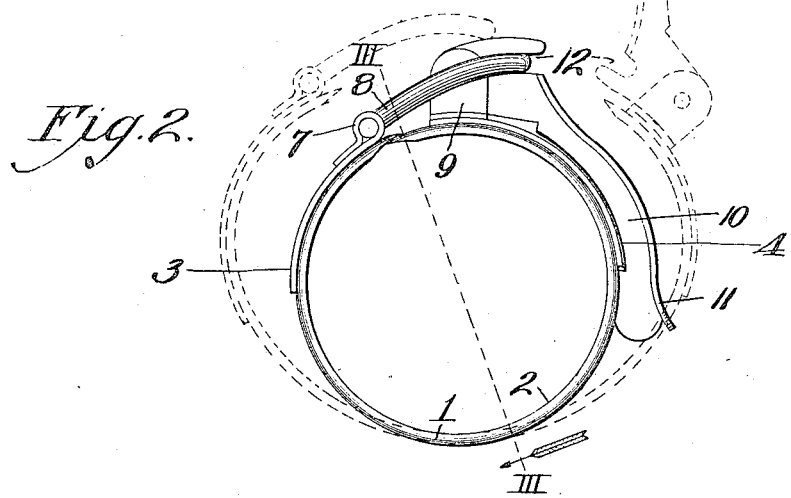
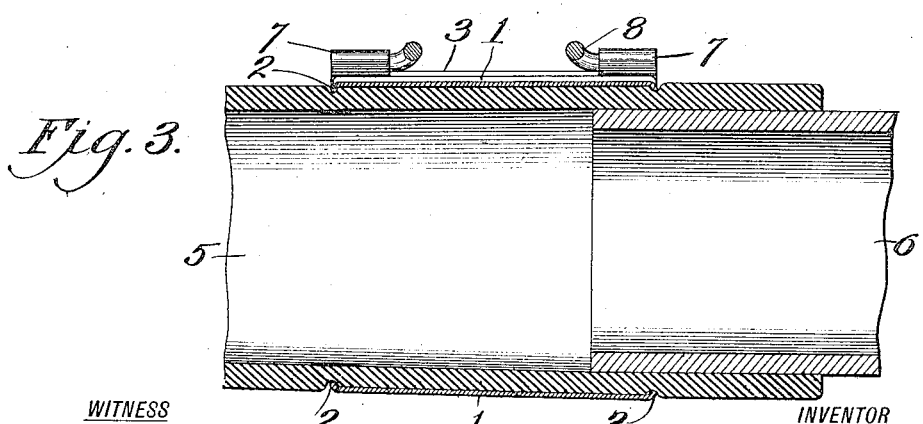
WITNESS
INVENTOR
T. J. Williams.
BY
ATTORNEY

UNITED STATES PATENT OFFICE.

THOMAS J. WILLIAMS, OF KANSAS CITY, KANSAS.

HOSE-CLAMP.

1,259,329.　　　　　Specification of Letters Patent.　　Patented Mar. 12, 1918.

Application filed February 14, 1916.　Serial No. 78,277.

*To all whom it may concern:*

Be it known that I, THOMAS J. WILLIAMS, a citizen of the United States, residing at Kansas City, in the county of Wyandotte and State of Kansas, have invented certain new and useful Improvements in Hose-Clamps, of which the following is a specification.

This invention relates to hose clamps designed chiefly for stopping leaks in air and steam hose and the like and has for its object to produce a clamp which automatically adjusts itself to apply uniform pressure on the inclosed portion of the hose regardless of whether the latter is of uniform diameter or is flared slightly caused through fitting over the end of a tubular coupling or nipple.

Another object is to produce a hose clamp which embeds itself slightly at its ends in the hose so as to insure a leak-tight connection therewith and which will be caused by expansion of the hose to clamp the same with increasing firmness.

Another object is to produce a hose clamp which is not only efficient but which can be applied in or removed from operative position, easily and quickly.

With these objects in view, the invention consists in certain novel and peculiar features of construction and organization as hereinafter described and claimed; and in order that it may be fully understood, reference is to be had to the accompanying drawing, in which—

Figure 1, is an elevation of a hose clamp embodying my invention applied in operative position to a section of hose.

Fig. 2, is an end view of the clamp in closed position in full lines and in an intermediate position in dotted lines.

Fig. 3, is a vertical longitudinal section taken on the line III—III of Fig. 2.

In the said drawings, 1 indicates the body of the clamp, the same being in the form of a split sleeve or collar of thin resilient metal, its resilient tendency being to open or expand as indicated by dotted lines in Fig. 2, and at its ends said split sleeve is formed with inwardly projecting flanges 2 for embedment in the hose to make an air-tight connection therewith as hereinafter explained.

3 and 4 are arcuate plates of stiff or substantially unyielding metal secured upon the outer sides of the sleeve adjacent the split thereof, these plates conforming substantially to the external diameter of the hose upon which the clamp is adapted to be secured.

The plate 4 is set back a short distance from the adjacent longitudinal edge of the sleeve so that the said edge may as a tongue be capable of underlapping the opposing longitudinal edge of the sleeve when the clamp is in operative position upon a hose. The setting of the plate 4 back from the longitudinal edge of the sleeve also permits of the resilient sleeve assuming a slightly tapering or flaring form to accommodate a hose 5 where the same may taper or flare from any cause, such for instance as where it cannot yield materially under the pressure of the clamp due to the fact that it is fitted over the end of a coupling or nipple 6, as shown in Fig. 3.

The reinforce plate 3 is provided at its ends adjacent the split in the sleeve with a pair of longitudinally alined hinge loops 7, and hingedly engaging the same is a substantially V-shaped link 8.

A pair of angle brackets 9 are secured to the reinforce plate 4 at the margin thereof adjacent the split in the sleeve, and pivoted to and between said brackets is a locking lever 10 which is curved to conform to the sleeve so that when in operative position it may lie against the same and project therefrom only sufficient to enable one to readily grasp it for unlocking purposes. For convenience in gripping it for unlocking purposes, it is preferably provided with lateral flanges 11. The locking lever is provided with a notch 12 to be engaged by the central portion of the V-shaped link, and the parts are so proportioned that when the clamp is in closed or operative position, the notch and engaging end of the link lie in a plane below the pivotal point of the lever with respect to the hinged end of the link so that any pressure tending to expand the hose will apply locking pressure through the link on the lever and thus guard against accidental unlocking movement of the lever.

Assuming that a hose springs a leak, a trainman, for instance, can fit one of these clamps over the leak. He then swings the hinge link toward the lever and swings the lever upward. At the same time he compresses the split sleeve until the central portion of the link enters the notch of the lever and then operates the lever to effect the closing of the sleeve, and the clamping of the same tightly upon the hose, it being obvious that in this action the inturned flanges 2 are slightly embedded in the hose and thus insure a fluid tight joint therewith. The clamp can be instantly detached by swinging the lever outward until the plane of the hinge loops 7 and notch 12 is outwardly of the pivotal point of the lever because as soon as this adjustment is effected the resiliency of the clamp results in its complete opening movement.

When the clamp is being placed in operative position upon a hose which from any cause, such as that mentioned is slightly flaring, the notch of the lever forms a fulcrum point upon which the sleeve will spring and thus adapt itself to the tapering form of the hose, the dotted lines in Fig. 1 indicating the clamp in a tapered or flaring position which it may assume to accommodate the hose under the conditions above mentioned.

From the above description it will be apparent that I have produced a hose clamp possessing the features of advantage enumerated as desirable and I wish it to be understood that while I have illustrated and described the preferred embodiment of the invention, I reserve the right to make all changes falling within the spirit and scope of the appended claims.

I claim:

1. A hose clamp, comprising a split sleeve of thin resilient metal, a substantially V-shaped link hinged at its end to opposite edge of the sleeve at one side of the split thereof, the hinge points being in transverse planes considerable distances from and at opposite sides of the transverse plane occupied by the apex of the link; and a lever mounted on the sleeve on the opposite side of the split thereof from the hinge points of the links and in the transverse plane occupied by the apex of the link; said lever having a hook to engage through said link at its apex and constitute a fulcrum for the link when the sleeve is distorted out of true cylindrical form; the pivotal point of the lever lying outward of a direct line between the hinge of the link and base of the hook when the lever is in operative position, to insure retention of the sleeve in closed position.

2. In a hose clamp, a thin resilient and relatively wide split sleeve provided at its ends with inturned flanges, and means detachably connecting opposite sides of the sleeve and for drawing and holding the same together; said means comprising two parts one fulcruming on the other to permit the sleeve to be distorted to slightly tapering form without affecting its clamping operation.

In testimony whereof, I affix my signature, in the presence of two witnesses.

THOMAS J. WILLIAMS.

Witnesses:
H. C. RODGERS,
G. Y. THORPE.

Copies of this patent may be obtained for five cents each, by addressing the "Commissioner of Patents, Washington, D. C."